United States Patent
Olsson et al.

(10) Patent No.: US 11,540,440 B2
(45) Date of Patent: Jan. 3, 2023

(54) LIFT DETECTION ARRANGEMENT IN A ROBOTIC LAWNMOWER

(71) Applicant: Globe (Jiangsu) Co., Ltd., Jiangsu (CN)

(72) Inventors: Johanna Olsson, Joenkoeping (SE); Eric Lennings, Huskvarna (SE)

(73) Assignee: Globe (Jiangsu) Co., Ltd., Jiangsu (CN)

(*) Notice: Subject to any disclaimer, the term of this patent is extended or adjusted under 35 U.S.C. 154(b) by 746 days.

(21) Appl. No.: 16/499,498

(22) PCT Filed: Jun. 11, 2018

(86) PCT No.: PCT/CN2018/090569
§ 371 (c)(1),
(2) Date: Sep. 30, 2019

(87) PCT Pub. No.: WO2019/169778
PCT Pub. Date: Sep. 12, 2019

(65) Prior Publication Data
US 2020/0367428 A1  Nov. 26, 2020

(30) Foreign Application Priority Data

Mar. 6, 2018  (WO) ............... PCT/CN2018/078149

(51) Int. Cl.
*A01D 34/00* (2006.01)
*A01D 67/00* (2006.01)
(Continued)

(52) U.S. Cl.
CPC .......... *A01D 34/008* (2013.01); *A01D 34/81* (2013.01); *A01D 67/005* (2013.01); *A01D 75/18* (2013.01); *A01D 2101/00* (2013.01)

(58) Field of Classification Search
CPC .... A01D 34/008; A01D 34/81; A01D 67/005; A01D 75/18; A01D 2101/00
(Continued)

(56) References Cited

U.S. PATENT DOCUMENTS 7,402,974 B2 * 7/2008 Jeon ..................... B60L 15/20
                                                    318/567
9,232,692 B2    1/2016 Bjorn et al.

FOREIGN PATENT DOCUMENTS

CN    104115621 A    10/2014
CN    203912605 U    11/2014
(Continued)

OTHER PUBLICATIONS

Search Report and Written Opinion in related International Patent Application No. PCT/US2018/090569 dated Dec. 12, 2018; 9 pages.

*Primary Examiner* — Mahmoud Gimie
(74) *Attorney, Agent, or Firm* — Rooney IP, LLC

(57) ABSTRACT

A lift detection arrangement in a robotic lawnmower for detecting a lift of a body of the robotic lawnmower relative to a chassis of the robotic lawnmower. The lift detection arrangement includes a collision absorber; and a sensor arrangement including a spring, a movable part, a metal plate and a sensor. The collision absorber is screwed to two plastic parts and arranged to allow a displacement of the body relative to the chassis in a collision plane during a collision between an obstacle and the robotic lawnmower, but not in a vertical direction. The moveable part is arranged to provide a displacement of the body relative to the chassis in a lift direction during a lift of the body. The sensor is configured to sense the distance to the metal plate that is fixed to the moveable part and to trigger a cut off of power
(Continued)

to a cutting blade of the robotic lawnmower if the distance becomes greater than a predetermined distance.

8 Claims, 5 Drawing Sheets

(51) Int. Cl.
*A01D 75/18* (2006.01)
*A01D 34/81* (2006.01)
*A01D 101/00* (2006.01)

(58) Field of Classification Search
USPC .......................................................... 56/10.2
See application file for complete search history.

(56) References Cited

FOREIGN PATENT DOCUMENTS

| CN | 106105542 A | 11/2016 |
| CN | 106304944 A | 1/2017 |
| CN | 106342485 A | 1/2017 |

\* cited by examiner

LIFT DETECTION ARRANGEMENT IN A ROBOTIC LAWNMOWER

TECHNICAL FIELD

The present invention relates generally to a lift detection arrangement in a robotic lawnmower. In particular, it relates to a lift detection arrangement for detecting a lift of a body of the robotic lawnmower relative to a chassis of the robotic lawnmower.

BACKGROUND ART

A lift detection arrangement in a robotic lawnmower is an important part to protect people from being injured by cutting blades if the robotic lawnmower is lifted during operation. When the lift of the body of the robotic lawnmower is detected, the lift detection arrangement is arranged to cut off the electricity supply to the cutting blades, thus stopping the rotation of the cutting blades.

There are lift detection arrangements in prior art, for example, U.S. Pat. No. 9,232,692 B2 that discloses a lift detection arrangement in a robotic lawnmower which may absorb some collision forces. The lift detection arrangement comprises a lift sensor for detecting a change in a spacing between two sensor parts of which one is arranged on a lift element and the other one is arranged on a joystick member, wherein one of the two sensor parts may be a Hall effect sensor and the other of the two sensor parts is a magnet. When a lift displacement over a predetermined threshold is detected by the sensor parts, the rotation of the cutting blades is stopped.

One of the problems with U.S. Pat. No. 9,232,692 is that the sensors and a Printed Board Circuit, PCB, connected thereto are not fully protected from water, even if a rubber coating can be arranged outside the PCB, the coating is easily damaged and may cause a water leakage which can damage the product.

Some other solutions having a joystick with a joint are complicated, expensive and take up much space. Thus, there is still room for improved lift detection arrangements.

SUMMARY OF INVENTION

An object of the present invention is to provide an improved lift detection arrangement in a robotic lawnmower.

According to a first aspect, the lift detection arrangement in the robotic lawnmower for detecting a lift of the body of the robotic lawnmower relative to a chassis of the robotic lawnmower, comprises a collision absorber, and a sensor arrangement comprising a first spring, a movable part, a metal plate and a sensor. The collision absorber is screwed to two plastic parts and arranged to allow a displacement of the body relative to the chassis in a collision plane during a collision between an obstacle and the robotic lawnmower. The collision absorber is ball-shaped at one end that is facing the body and pivotally attached to a bowl-shaped snap connector, which is fixedly attached to the body. The moveable part is arranged to provide only a displacement of the body relative to the chassis in a lift direction during a lift of the body, and the first spring is arranged to exert a force on the moveable part such that there is a threshold force that needs to be exceeded before the moveable part starts to move in the lift direction. The sensor is arranged in the chassis and configured to sense the distance to the metal plate that is fixed to the moveable part and to trigger a cut off of power to a cutting blade of the robotic lawnmower if the distance becomes greater than a predetermined distance.

According to some embodiments herein, the sensor is a HALL sensor or an inductive sensor.

According to other embodiments the lift detection arrangement may further comprise a fastening cap, which together with a chassis connector secures the spring, the movable part and the metal plate to the chassis by means of fastening means.

In another embodiment the sensor in the lift detection arrangement is arranged on a Printed Circuit Board, PCB, positioned in the chassis.

Preferably, the collision absorber comprises a second spring, wherein the upper part of the second spring is screwed to the ball-shaped top and the lower part of the second spring is screwed to the moveable part, thus the second spring is fastened in an initial state.

In yet another embodiment the lift detection arrangement further comprises a protective bellows, which encloses the collision absorber, said protective bellows is fixedly attached to the bowl-shaped snap connector at a top end and fixedly attached to the fastening cap at a bottom end.

Preferably the movable part is made of plastic and the first spring is arranged around the periphery of the movable part.

One advantage of the invention is, the sensor is kept inside the chassis without having any extra holes for cables, which makes the design of the lift detection arrangement simple. Furthermore, it is also easy to replace part or whole parts of the arrangement.

Another advantage of the invention is, it can be used in situations with limited space.

Moreover, as the chassis is waterproof, the safety of both the people and the product will be ensured.

BRIEF DESCRIPTION OF DRAWINGS

The invention is now described, by way of example, with reference to the accompanying drawings, in which.

DESCRIPTION OF EMBODIMENTS

In the following, a detailed description of the lift detection arrangement is described.

Figure 1:
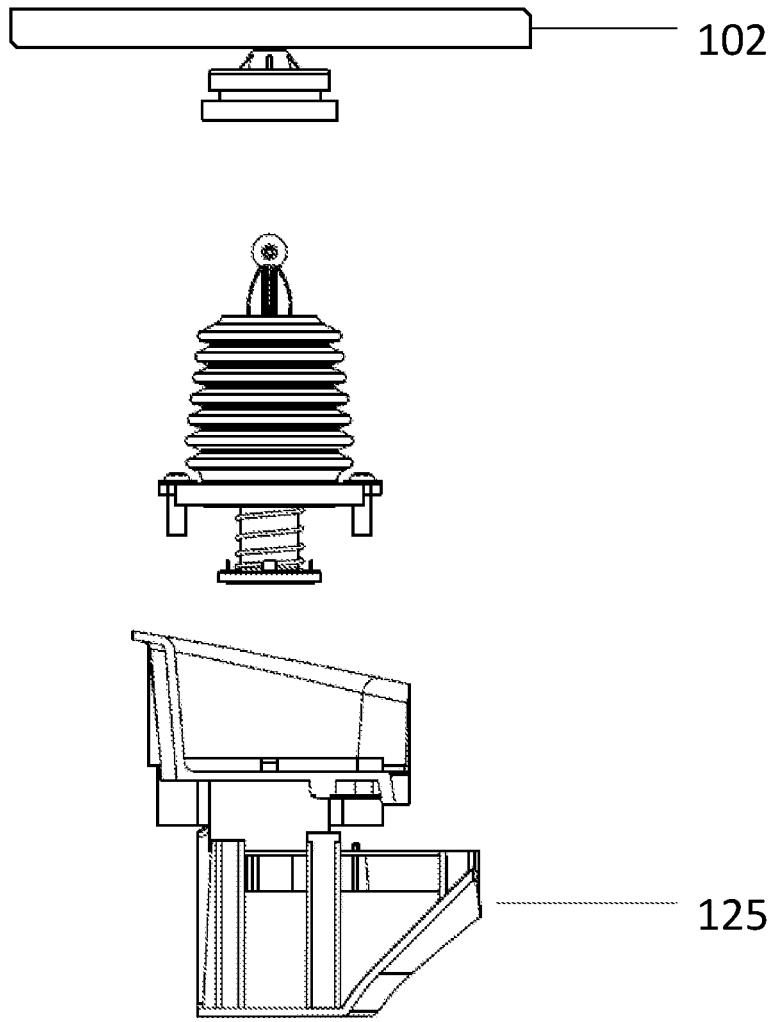
FIG. 1 is a schematic view of a lift detection arrangement provided between a body and a chassis of a robotic lawnmower.

As can be seen in FIG. 1 the lift detection arrangement is provided between a body 102 and a chassis 125 of the robotic lawnmower.

Figure 2A:
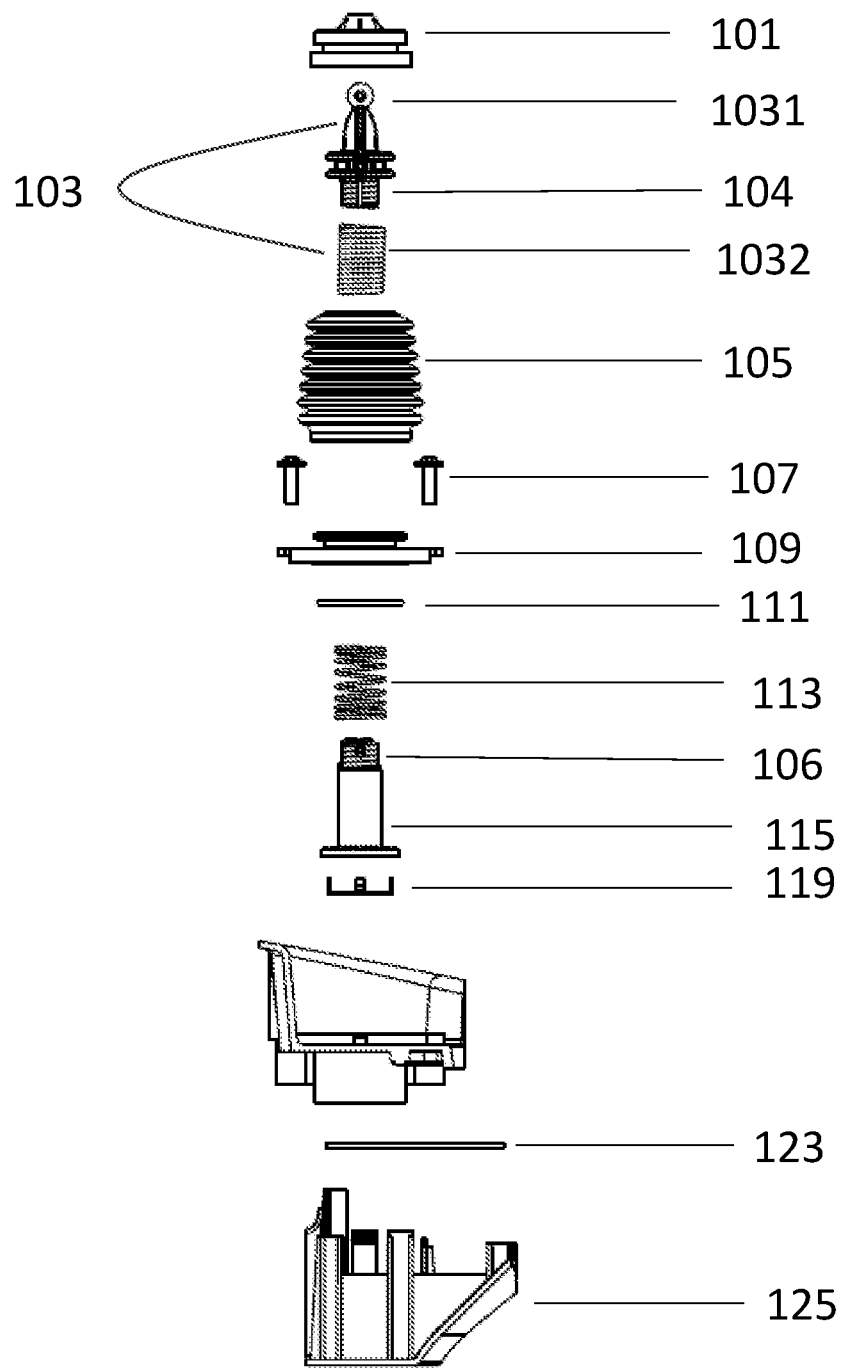
FIG. 2A is an exploded view of the lift detection arrangement.
Figure 2B:
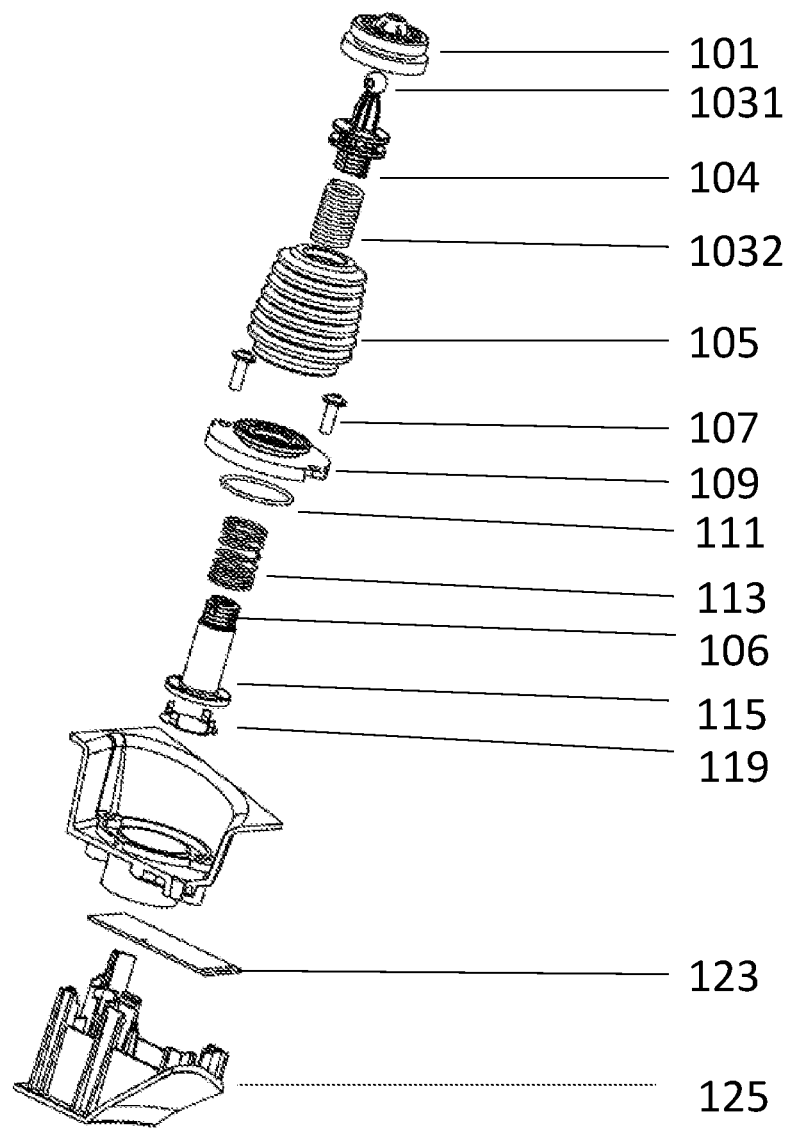
FIG. 2B is another exploded view of the lift detection arrangement

FIG. 2A and FIG. 2B depict, schematically and by way of example, exploded views of a lift detection arrangement in a robotic lawnmower according to some embodiments herein. The lift detection arrangement comprises a bowl-shaped snap connector 101, a collision absorber 103, a protective bellows 105, fastening means 107, a fastening cap 109, an O-ring, a first spring 113, a moveable part 115, a metal plate 119, a chassis connector 121 and a sensor 123.

The lift detection arrangement has two different functions, firstly it is to detect vertical movement, i.e. detect if someone tries to lift the robotic lawnmower and secondly to absorb horizontal movement, such that horizontal movements do not induce vertical movement in the lift detection arrangement. With other words, if the robotic lawnmower for example collides with a tree, the vertical forces that the body 102 of the robotic lawnmower is subjected to should be absorbed. If such forces are not absorbed the lift detection arrangement would falsely trigger cutoff of the cutting blades.

The snap connector 101 is fixedly secured to the body 102 or hood of the robotic lawnmower. A collision absorber 103 has a ball-shaped top 1031, i.e. at an end that is facing the body 102 and the snap connector 101. The ball-shaped top 1031 is adapted to be pivotally attached to or inserted in the snap connector 101. The collision absorber 103 comprises a second spring 1032 screwed to two plastic parts 104, 106. The upper part of the second spring 1032 is screwed to a threaded plastic part 104 of the ball-shaped top 1031 and the lower part of the second spring 1032 is screwed to a threaded plastic part 106 of the moveable part 115. The second spring 1032 is used in the collision absorber 103 because it provides a stable zero position, making it easier to mount the body since the second spring is kept by the two plastic parts in an initial state and does not deform easily when it is attached to the two plastic parts. When the robotic lawnmower has horizontal collision, the biasing force of the second spring absorbs the horizontal movement. Thus, the collision absorber 103 allows a displacement of the body 102 of the robotic lawnmower relative to the chassis 125 in a collision plane during a collision of the robotic lawnmower, but limited in a vertical plane. The collision plane is substantially parallel with the lawn to be mowed, i.e. substantially a horizontal plane. A protective bellows 105 may optionally be arranged to enclose the collision absorber 103, such that it is protected from dust and the like of the outside environment.

In order to detect vertical displacement of the body 102, the moveable part 115 is allowed to move in relation to the chassis 125 only in a lift direction during a lift. The moveable part 115 comprises a threaded plastic part 106 which together with the threaded plastic part 104 on the ball-shaped top 1031 keeps the second spring 1032 in an initial state. The first spring 113 is arranged around the periphery of the movable part 115 and is arranged to exert a force on the moveable part 115 such that there is a threshold force that needs to be exceeded before the moveable part 115 starts to move. The biasing force of the spring 113 is determined such that it more or less prevents displacement of the moveable part 115 when the robotic lawnmower rides over small bumps and the like during operation, but allows displacement of the moveable part 115 during a lifting operation. The metal sheet 119 is fixed at the bottom of the movable part 115.

Since the metal plate 119 is fixed to the moveable part 115 it will move in the vertical direction together with the movable part 115. According to some embodiments herein, the metal plate 119 is an aluminum plate. The sensor 123 is arranged in and fixed to the chassis 125. The sensor 123 is configured to sense the distance d to the metal plate 119 that is fixed to the moveable part 115. If the distance becomes greater than a predetermined distance the sensor 123 will trigger a cut off of the power to the cutting blades of the robotic lawnmower. The sensor 123 may be any type of sensor that able to detect the distance d to the metal plate 119, such as a magnetic sensor, inductive sensor or a Hall effect sensor. The trigger signal from the sensor 123 may be sent to a control device (not shown in the figures) handling the operation of the robotic lawnmower. According to some embodiments herein, the sensor is arranged on a PCB positioned in the lower part of the chassis 125.

The lift detection arrangement further comprises the fastening cap 109 which together with the chassis connector 121 and fastening means 107, such as screws, secures the lift detection arrangement to the chassis 125. In one embodiment there is also provided the O-ring 111, such that the lift detection arrangement is properly sealed.

Figure 3:
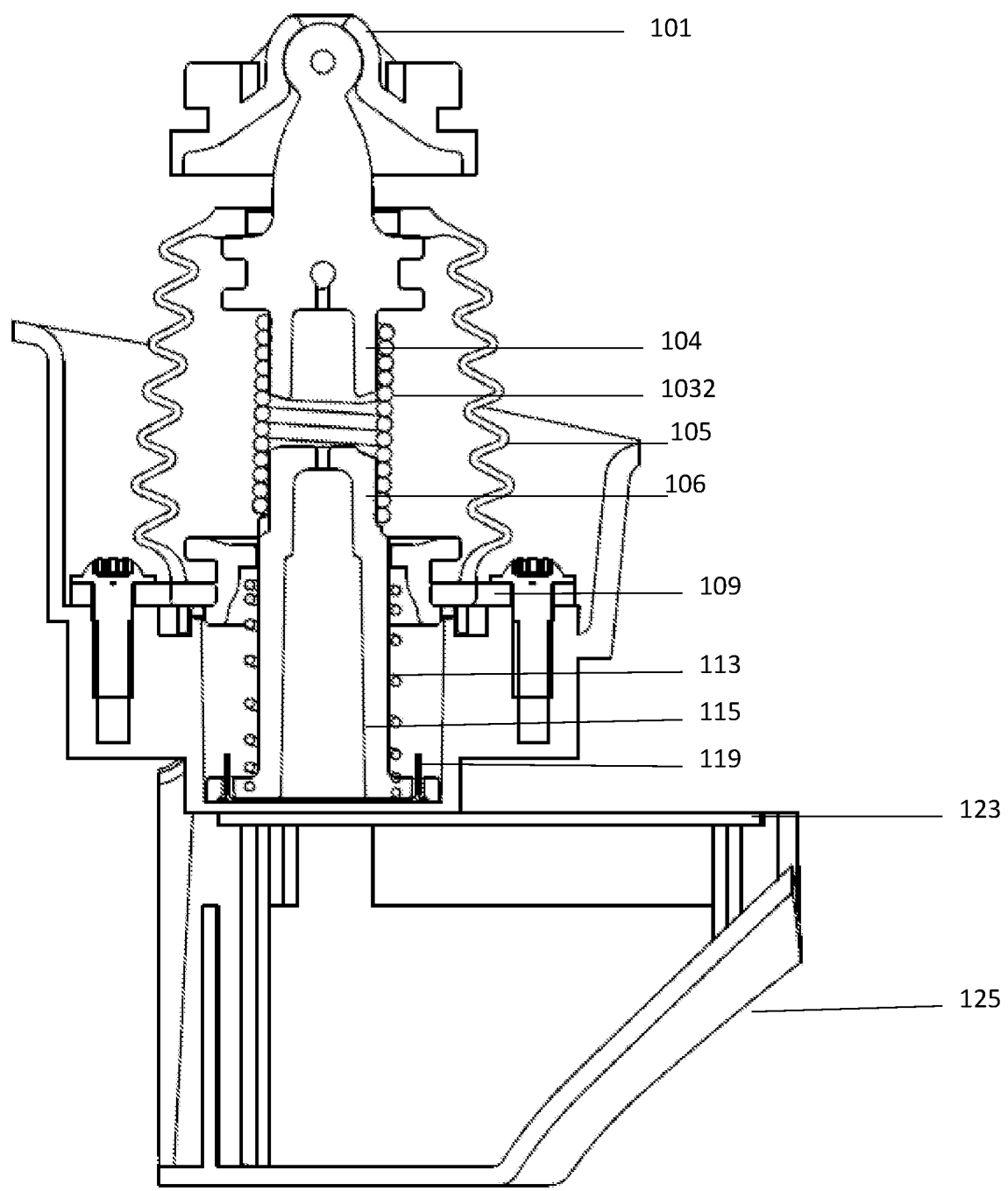
FIG. 3 is sectional view of the lift detection arrangement in a normal position.
Figure 4:
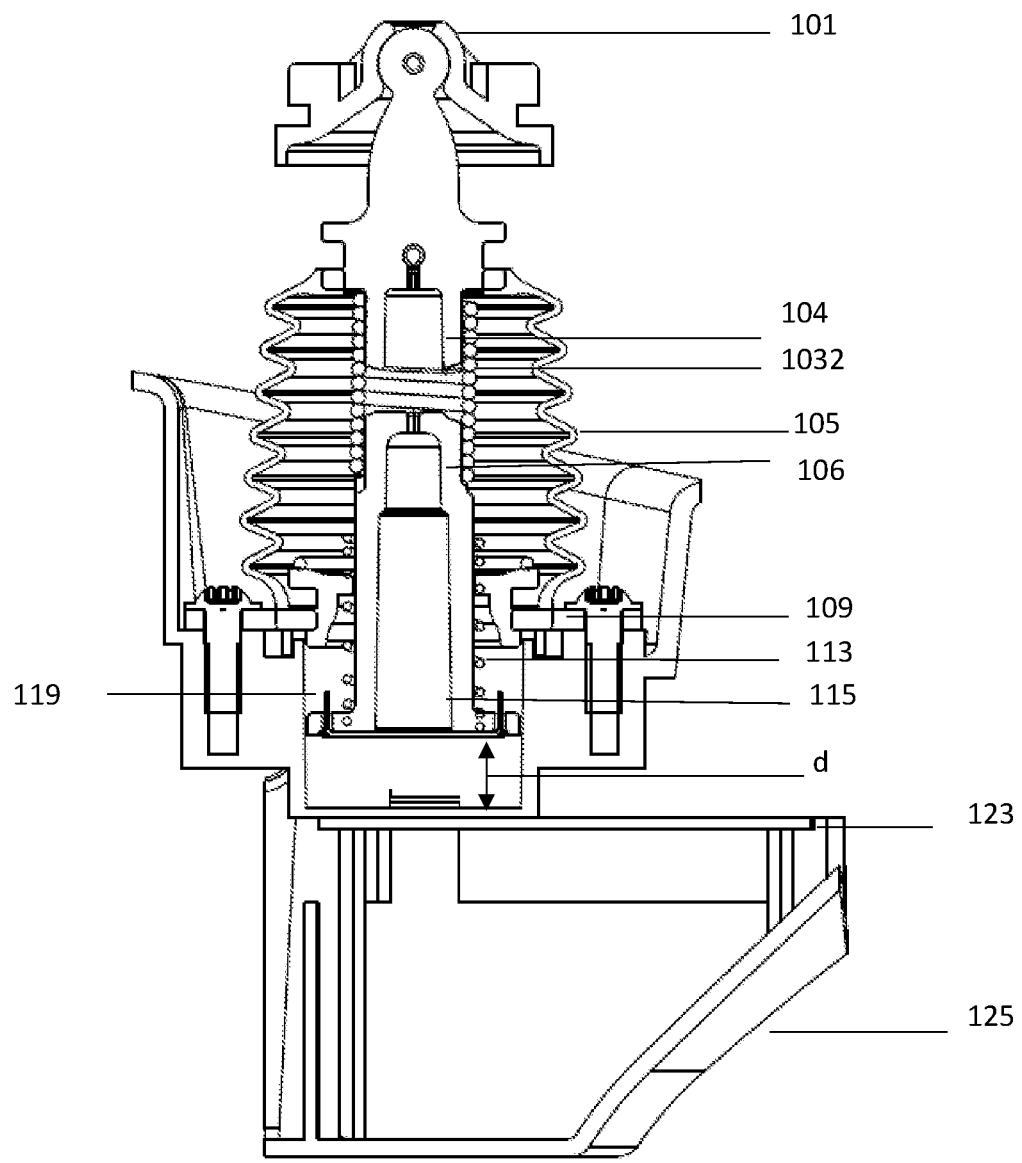
FIG. 4 is a sectional view of the lift detection arrangement during a lift.

Turning now to FIGS. 3 and 4, which are sectional views of the lift detection arrangement. FIG. 3 shows the lift detection arrangement in a normal position, i.e. when there is no lift and the metal plate 119 is in the vicinity of the sensor 123. In this state the first spring 113 is in unstrained. When the body 102 of robotic lawnmower is lifted, the movable part 115 together with the collision absorber 103 will move upwards relative to the chassis 125 and the spring 113 is compressed. The metal plate 119 at the bottom moveable part 115 will also move upwards and the sensor 123 will detect the changing distance between the sensor 123 and the metal plate 119. Thus, the lift of the body 102 of the robotic lawnmower is detected. As the distance d reaches a predetermined distance the sensor 123 will send a trigger signal to a control device controlling the operation of the lawnmower, which will stop the power supply to the cutting blades.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A lift detection arrangement in a robotic lawnmower for detecting a lift of a body of the robotic lawnmower relative to a chassis of the robotic lawnmower, comprising:
   a collision absorber; and
   a sensor arrangement comprising a first spring, a movable part, a metal plate and a sensor;
   wherein the collision absorber is screwed to two plastic parts and arranged to allow a displacement of the body relative to the chassis in a collision plane during a collision between an obstacle and the robotic lawnmower,
   wherein the collision absorber is ball-shaped at one end facing the body and pivotally attached to a bowl-shaped snap connector, which is fixedly attached to the body,
   wherein the moveable part is arranged to provide a displacement of the body relative to the chassis in a lift direction during a lift of the body,
   wherein the first spring is arranged to exert a force on the moveable part such that there is a threshold force that needs to be exceeded before the moveable part starts to move in the lift direction, and
   wherein the sensor is arranged in the chassis and configured to sense the distance (d) to the metal plate that is fixed to the moveable part and to trigger a cut off of power to a cutting blade of the robotic lawnmower if the distance becomes greater than a predetermined distance.

2. The lift detection arrangement according to claim 1, wherein the sensor is a HALL sensor or an inductive sensor.

3. The lift detection arrangement according to claim 2, wherein the sensor is arranged on a Printed Circuit Board, PCB, positioned in the chassis.

4. The lift detection arrangement according to claim 1, wherein the lift detection arrangement further comprises a fastening cap, which together with a chassis connector secures the first spring, the movable part and the metal plate to the chassis by means of fastening means.

5. The lift detection arrangement according to claim 1, wherein the collision absorber comprises a second spring, wherein the upper part of the second spring is screwed to the plastic part on the ball-shaped end and the lower part of the second spring is screwed to the plastic part on the moveable part, thus the spring is kept in an initial state.

6. The lift detection arrangement according to claim 5, wherein the lift detection arrangement further comprises a protective bellows, which encloses the collision absorber, said protective bellows is fixedly attached to the bowl-shaped snap connector at a top end and fixedly attached to the fastening cap at a bottom end.

7. The lift detection arrangement according to claim 1, wherein the movable part is made of plastic and the first spring is arranged around the periphery of the movable part.

8. The lift detection arrangement according to claim 1, wherein the metal plate is made of aluminum.

* * * * *